Feb. 26, 1957  G. W. CRABTREE  2,782,876
PISTON VALVE FOR HYDRAULIC DAMPERS
Filed March 15, 1952  3 Sheets-Sheet 1
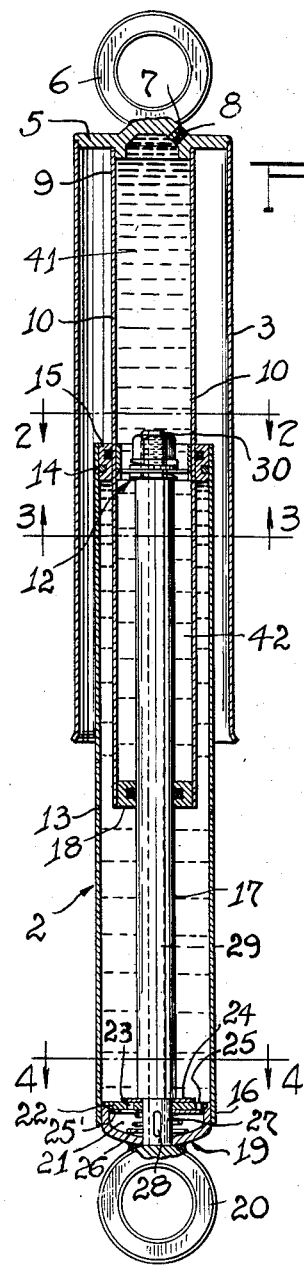
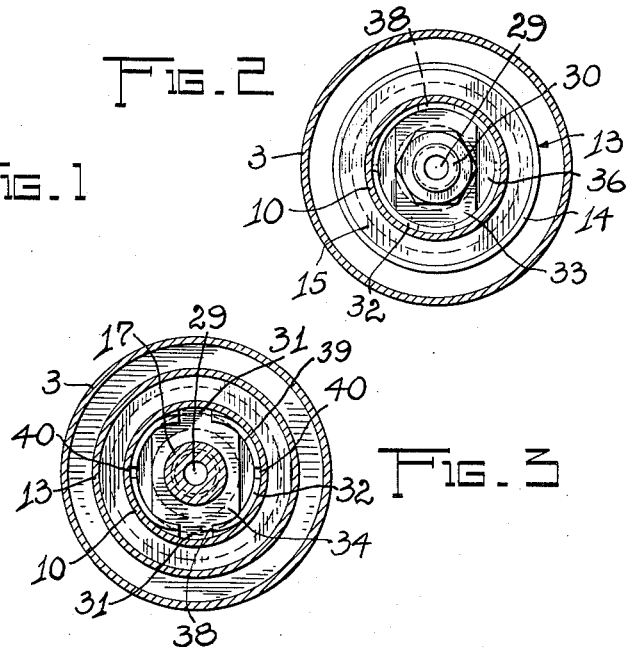
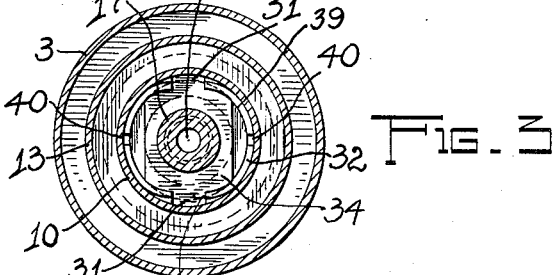
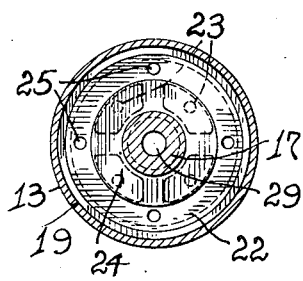
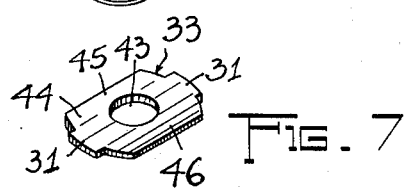
INVENTOR.
GEORGE W. CRABTREE
BY
ATT.

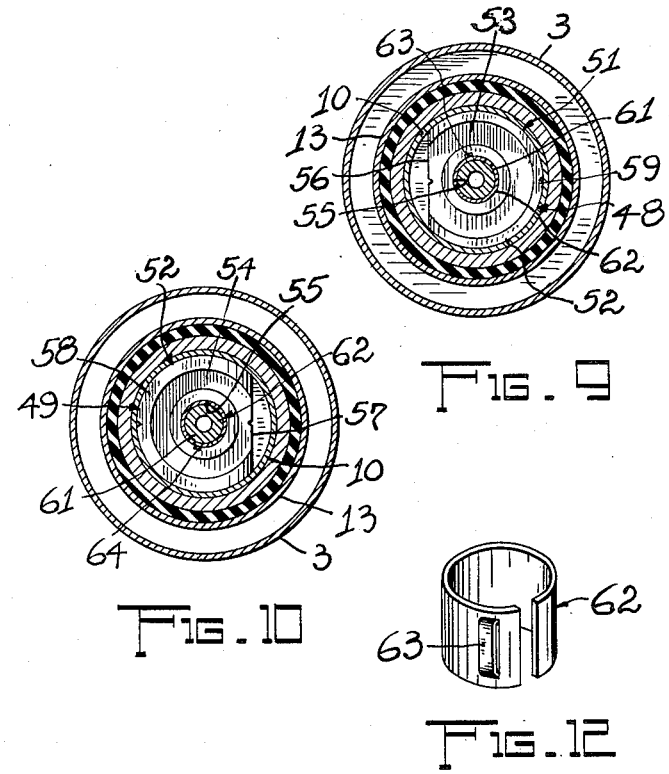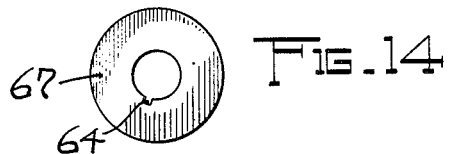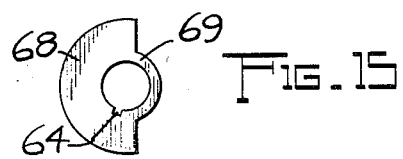

Feb. 26, 1957 G. W. CRABTREE 2,782,876
PISTON VALVE FOR HYDRAULIC DAMPERS
Filed March 15, 1952 3 Sheets-Sheet 3

INVENTOR
GEORGE W. CRABTREE

BY *[signature]*
ATTORNEY

United States Patent Office 2,782,876
Patented Feb. 26, 1957

2,782,876
PISTON VALVE FOR HYDRAULIC DAMPERS

George W. Crabtree, Cleveland Heights, Ohio

Application March 15, 1952, Serial No. 276,772

5 Claims. (Cl. 188—88)

This invention relates in general to combined piston and valve constructions, and, more particularly to combined piston and valve constructions for hydraulic spring controlling units of the cylinder piston type which effect checking and retarding of spring movements by forcing liquid in opposite directions through a combined piston and valve construction. Presently used constructions of this type effect control of the flow of liquid in hydraulic spring controlling units either through a combined piston and valve construction embodying different sets of jointly controlled passages or a single set of individually controlled passages; however, as the active liquid passages in these constructions have constant cross section, the best possible checking or retarding of spring movements by these constructions necessitates evaluation of the mean cross section for the liquid passages, taking into consideration all possible conditions present in springs under compression and reflex stresses.

It is the general object of this invention to provide a new and practical combined piston and valve construction for hydraulic spring controlling units which construction embodies pressure controlled liquid passage means constructed to differentially vary their active cross section proportionate to the pressure of liquid passing therethrough to fully control the forcible flow of the liquid through the combined piston and valve construction when in spring controlling operations liquid is forced by the combined piston and valve construction through such construction.

Another object of the invention is the provision of a new and practical combined piston and valve construction for hydraulic spring controlling units, which construction embodies pressure controlled liquid passage means formed by a tubular member and resiliently deformable disk means arranged within said tubular means and adapted to differentially vary by resilient deformation the cross section of the active liquid passage through the combined piston and valve construction proportionate to liquid pressure variations effected by spring controlling operations in hydraulic spring controlling units.

A further object of the invention is the provision of a combined piston and valve construction for hydraulic spring controlling units which construction embodies a pressure controlled liquid passage means formed by a tubular member, resiliently deformable disk means arranged within said tubular means, and controlling means for the disk means adapted to limit the degree of deformation of the resiliently deformable disk means.

Still another object of the invention is the provision of a combined piston and valve construction for hydraulic, cylinder-piston spring controlling units which construction embodies disk-like channeled piston members and resiliently deformable valve disk means of spring metal arranged between and cooperating with the channeled piston members in controlling the flow of liquid in said units proportionate to the differentiating liquid pressures in spring controlling units when in spring controlling operations liquid is forced by actuation of the combined piston and valve construction through such construction.

Additional objects and novel features of construction, combination and relation of parts by which the objects in view have been attained will appear and are set forth in detail in the course of the following specification.

The drawings accompanying and forming part of the specification illustrate certain practical embodiments of the invention, but it will be apparent as the specification proceeds that the structure may be modified and changed in various ways without departure from the true spirit and broad scope of the invention.

In the drawings:

Fig. 1 is a longitudinal sectional view partly in elevation of a double-acting, hydraulic spring-controlling unit embodying a combined piston and valve member constructed in accordance with the invention;

Fig. 2 is an enlarged, cross-sectional view taken on line 2—2 of Fig. 1;

Fig. 3 is an enlarged, cross-sectional view taken on line 3—3 of Fig. 1;

Fig. 4 is an enlarged, cross-sectional view taken on line 4—4 of Fig. 1;

Fig. 7 is a perspective view of one of the backing plates for the valve disk member;

Fig. 9 is a cross sectional view on line 9—9 of Fig. 8;

Fig. 10 is a cross sectional view on line 10—10 of Fig. 8;

Fig. 12 is a perspective view of the key sleeve locating the disk-line channeled piston members with respect to each other;

Fig. 14 is a plan view of one of the valve disk members of the piston and valve construction shown in Fig. 13; and Fig. 15 is a plan view of the other valve disk member shown in Fig. 13.

Figure 5:
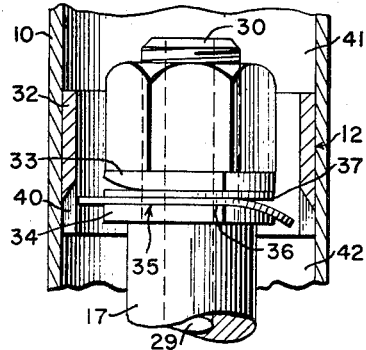
Fig. 5 is an enlarged fragmentary longitudinal sectional view through combined piston and valve structure showing the shape of the valve disk member when the hydraulic spring controlling unit shown in Fig. 1 is subjected to compression stresses.
Figure 6:
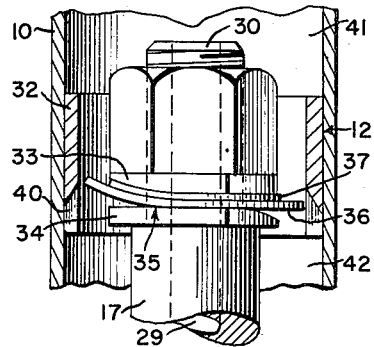
Fig. 6 is an enlarged fragmentary longitudinal sectional view similar to Fig. 5 showing the shape of the valve disk member when the hydraulic spring controlling unit is subjected to tensile stresses.
Figure 8:
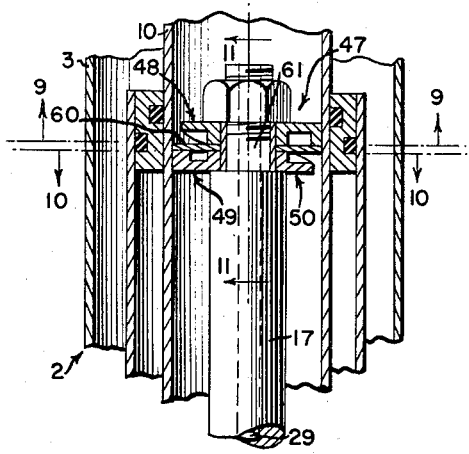
Fig. 8 is a fragmentary longitudinal sectional view through a modified form of a combined piston and valve construction shown in the cylinder of a hydraulic piston spring controlling unit.

Referring now in detail to the exemplified form of the spring controlling unit shown in the drawings and embodying the invention, reference numeral 2 denotes a double-acting, hydraulic spring controlling unit which includes a tubular shielding sleeve 3 closed at its upper end 4 by a head 5 with a ring 6. Head 5 includes a filling opening 7 closed by a removable plug 8 and has fluid-tightly secured thereto the upper end 9 of a tubular cylinder 10 enclosing valved piston member 12. Tubular cylinder 10 is encircled by a tubular reservoir 13 which fluid-tightly, slidably engages with its upper end by a ring-shaped collar 15 the outer surface of cylinder 10 and which at its lower end 16 is coupled with valved piston member 12 by a tubular piston rod 17 extended into cylinder 10 through ring-shaped end wall 18 thereof.

Reservoir 13 is closed at its lower end by cup-shaped member 19 provided with an outer ring 20 similar to ring 6. This cup-shaped member forms a liquid chamber 21 below reservoir 13 and includes as upper wall a heavy disk 22 provided with a plurality of bores 23 and 25, bores 23 being covered by a flexible valve disk 24 and bores 25 being covered by a rather thin and flexible valve disk 25' which is yieldingly held in contact with disk 22 by a spring 26. Cup-shaped member 19 mounts the lower end 27 of tubular piston rod 17 which is formed with a ring-shaped shoulder seating valve disk 24 and has its axial passage 29 through a cross bore 28 communicating with liquid chamber 21.

Tubular piston rod 17 extends from liquid chamber 21 into chamber 10 and mounts on its upper reduced externally threaded end 30 and valved piston member 12 which is slidably arranged in cylinder 10 for reciprocatory movements with respect thereto. This valved piston member embodies a tubular base or guide member 32 sized to slidably fit cylinder 10. Tubular base 32 is secured to piston rod 17 by perforated spaced backing plates 33, 34 contacting the opposite faces of a resiliently deformable valve disk member 35 arranged between plates 33, 34. The valve disk member 35 includes a thin metal valve disk 36 substantially fitting the bore of base member 32 and a second thin metal disk 37 smaller than valve disk 36. Backing plates 33 and 34 are elongated and non-rotatably engaged with base member 32 by oppositely arranged tongue or finger portions 31 extended into cut-out portions 38 in peripheral wall 39 of base member 32 and secured to the base member by peening its peripheral wall in areas adjacent to cut-out portions 38 over lower backing plate 34 (see Fig. 3). In addition base member 32 is formed with elongated, narrow slots 40 in its peripheral wall 39 which slots extend parallel to the axis of said base member and are symmetrically arranged with respect to cut-out portions 38. These slots provide restricted communicating passages between the chamber portions 41 and 42 of cylinder 10. Backing plates 33, 34 are identically constructed and have elongated shape and each of these backing plates includes a central bore 43 and a backing surface 44 having a surface portion 45 extended in a straight plane and a surface portion 46 extended in a curved plane.

Backing plates 33 and 34 contact with their backing surfaces opposite faces of valve disk member 35 so that the curved portions 46 of their backing surfaces extend in opposite directions and permit differential limited bending of the valve disk member in either direction when subjected to differentiating liquid pressures in chamber portions 41 and 42 of cylinder 10. Bending of valve disk member 35 in a downward direction by liquid pressure in chamber portion 41 is counteracted only by the yielding resistance of valve disk 36 (see Fig. 5) and bending of valve disk member 35 in an upward direction by excessive liquid pressure in chamber portion 42 is counteracted by the yielding resistance of valve disk 36 and the metal disk 37 so that the valved piston member 35 offers less resistance to liquid under pressure traveling from chamber portion 41 to 42 than liquid traveling in the opposite direction from chamber portion 42 to chamber portion 41.

When attached to the frame and axle of an automobile, relative movements between frame and axle effect reciprocating movements of valved piston member 12 in cylinder 10 and thereby forces liquid under pressure from chamber portion 41 through piston member 12 into chamber portion 42 and vice versa; and, furthermore, effects discharge of liquid from cylinder 10 into liquid reservoir 13, and, vice versa, forced filling of cylinder 10 with liquid from reservoir 13. This is necessary as the volume of liquid forced from chamber portion 41 into chamber portion 42 is greater than the volume of liquid forced from chamber portion 42 into chamber portion 41. The difference in the volume of this forcibly displaced liquid is due to the difference in active cross section of chamber portions 41 and 42, chamber portion 42 having substantially smaller active cross section as piston rod 17 is extended through chamber portion 42.

In operation the spring-controlling unit 2 when under compression-stresses forces liquid from chamber portion 41 through valved piston member 12 into chamber portion 42 and excess liquid from chamber portion 41 through bore 29 in piston rod 17 and cross bore 28 into liquid chamber 21 and hence through bores 23 covered by valve disk 24 into reservoir 13. Liquid forced from chamber portion 41 through piston member 12 resiliently bends valve disk 36 (see Fig. 5) proportionate to the liquid pressure and thereby opens a passage for the liquid with a cross section varying proportionate to the pressure of the liquid. When spring controlling unit 2 is subjected to tensile stresses, liquid is forced from chamber portion 42 through valved piston member 12 into chamber portion 41 and at the same time liquid from liquid chamber 21 is drawn through tubular piston rod 17 into chamber portion 41 and liquid from reservoir 13 is drawn through bores 25 covered by valve disk 25 into liquid chamber 21.

The modified form of the invention shown in Figs. 8 through 12 discloses a combined piston and valve construction 47 which includes specifically designed, axially perforated, backing plates 48, 49 constructed and sized to form with piston rod 17 a piston-like element 50. These backing plates have partly curved and partly straight circumferences and are sized to slidably fit with their curved peripheral portions 51, 52 the cylinder 10 of spring-controlling unit 2. Backing plates 48 and 49 are formed with curved channel-like recesses 53, 54, respectively, arranged concentrically to their axial bores 55, which recesses intersect the straight peripheral portions 56, 57 of the backing plates to permit entering into and discharge of liquid from said recesses. In addition backing plates 48 and 49 have their channeled faces 58 and 59, in areas adjacent to straight peripheral portions 56, 57, convexly curved in a manner similar to the curved portion 46 of backing plates 33, 34.

Backing plates 48 and 49, which engage with their channeled faces 58, 59 the opposite faces of a thin, resilient, ring-shaped, valve disk member 60 and are secured jointly with such valve disk member to the threaded reduced end portion 61 of piston rod 17, form the combined piston and valve member 47. This latter member has the straight peripheral portions 56, 57 of its backing plates 48, 49 extended in opposite directions and held in proper radial position with respect to each other by a key sleeve 62 the key 63 of which is extended in key slots 64 of the backing plates and valve disk member 60.

Figure 11:
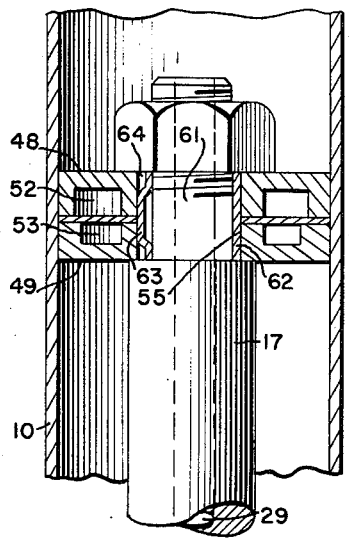
Fig. 11 is a longitudinal sectional view on line 11—11 of Fig. 8.

Operation of the modified form of the invention is similar to the operation of the structure previously described with the exception that all displaced liquid is forced to travel through one or the other of the channel-like recesses 56, 57 in accordance with the movement of member 47 in cylinder 10. This action affords a simple and practical way to additionally proportionally control compression and rebound stresses of springs by changing the active cross sections of channeled recesses 56 and 57 in accordance with the desired control of spring stresses as will readily be seen from inspection of Fig. 11 showing a cross section of channeled recess 56 substantially different from the cross section of channeled recess 57.

Figure 13:
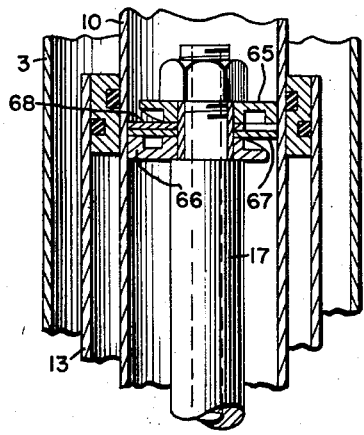
Fig. 13 is a fragmentary longitudinal sectional view similar to Fig. 8 of a combined piston and valve construction embodying a plurality of valve disk members.

The modified form of the invention shown in Figs. 13 through 15 is substantially the same as the form of the invention disclosed in Figs. 8 through 12 with the exception that the two backing plates 65 and 66 are of identical construction and have arranged therebetween two valve disk members 67 and 68, valve disk member 67 being a thin, resilient, ring-shaped disk similar to valve disk member 60, and valve disk member 68 being a thin, resilient member having a shape similar to but slightly larger than a half-circular disk including a full circular perforated inner area 69 insuring proper mounting of valve disk member 68 on the reduced end portion 61 of piston rod 17. This arrangement of a combined piston and valve construction permits use of identically constructed backing plates 65 and 66 as valve disk members 67 and 68 permit the above referred to additional proportional control of compression and rebound stresses of springs.

Having thus described my invention, what I claim is:

1. A valved piston structure for hydraulic shock absorbers of the cylinder piston type comprising a piston having an axial bore, resilient valve disk means within said bore fitting same and arranged crosswise thereof, said valve disk means embodying a plurality of thin, resilient valve disks differentiating in area with respect to each other with the largest of said valve disks dimensioned to fit the bore in said piston, backing elements at opposite sides of the valve disk means, and means coupling the backing elements and valve disk means with the piston, said backing elements including central areas in direct contact with central portions of the valve disk means, and laterally offset local areas spaced from lateral portions of the valve disk means and arranged in laterally offset relation to said central areas, the laterally offset areas permitting a limited localized deflection of a portion of the valve disk means when subjected to hydraulic pressure, which deflection causes forming of a pressure-responsive, variable crescent-shaped fluid passage through the valved piston structure between the wall of the bore of the piston and the edge of the deflected valve disk means.

2. A valved piston structure as described in claim 1, wherein the valve disk means and the backing elements are centrally perforated, wherein the valve piston structure has attached thereto a piston rod including a reduced end portion within the bore of the piston and wherein said end portion is extended through the perforations in the valve disk means and the backing elements and connected therewith.

3. A valved piston structure as described in claim 1, wherein the valve disk means embody a resilient valve disk fitting the bore in said piston and a resilient disk-like member having smaller cross section than the bore of said piston.

4. A valved piston structure as described in claim 1, wherein the two backing elements are of identical construction, mounted in inverted position with respect to each other and positioned to extend their out-of-contact areas in symmetrical relation with respect to the axis of the piston.

5. A valved piston structure as described in claim 1, wherein the localized out-of-contact areas of the backing elements are curved in a direction away from the valve disk means.

References Cited in the file of this patent

UNITED STATES PATENTS

| | | |
|---|---|---|
| 788,337 | Slick | Apr. 25, 1905 |
| 1,633,772 | Clapp | June 28, 1927 |
| 2,060,590 | Padgett | Nov. 10, 1936 |
| 2,327,295 | Whisler | Aug. 17, 1943 |
| 2,465,680 | Focht | Mar. 29, 1949 |
| 2,546,051 | Whisler | Mar. 20, 1951 |

FOREIGN PATENTS

| | | |
|---|---|---|
| 123,526 | Australia | Feb. 7, 1947 |